(12) United States Patent
Chen et al.

(10) Patent No.: US 6,843,128 B2
(45) Date of Patent: Jan. 18, 2005

(54) METHOD FOR DETERMINING AUTOMOTIVE BRAKE STRUCTURE VIBRATION DAMPING AND FRICTION MATERIAL BONDING

(75) Inventors: Frank Chen, Rochester Hills, MI (US); Alexander Petniunas, Dearborn, MI (US); Ronald L. Quaglia, Novi, MI (US); James L. Swayze, S. Rockwood, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/707,294

(22) Filed: Dec. 3, 2003

(65) Prior Publication Data

US 2004/0107772 A1 Jun. 10, 2004

Related U.S. Application Data

(60) Provisional application No. 60/430,583, filed on Dec. 4, 2002.

(51) Int. Cl.[7] .......................... G01N 29/00; F16F 11/00
(52) U.S. Cl. .......................... 73/574; 73/54.25; 73/579; 73/657; 73/662; 188/381
(58) Field of Search .................. 73/574, 54.25, 73/579, 593, 660, 662, 11.05, 657; 188/381

(56) References Cited

U.S. PATENT DOCUMENTS

| | | | |
|---|---|---|---|
| 5,372,221 A | | 12/1994 | Jalbert |
| 5,456,339 A | * | 10/1995 | Zeng ..................... 188/250 E |
| 5,535,859 A | * | 7/1996 | Zeng ..................... 188/250 B |
| 5,887,686 A | * | 3/1999 | Tanaka et al. ........... 188/250 E |
| 6,014,899 A | * | 1/2000 | Uhlig et al. ................ 73/664 |
| 6,145,382 A | * | 11/2000 | Nagasawa et al. ........... 73/664 |
| 6,209,396 B1 | * | 4/2001 | Wortge et al. ............... 73/657 |
| 6,257,063 B1 | * | 7/2001 | Uhlig ........................ 73/579 |
| 6,314,813 B1 | * | 11/2001 | Uhlig ........................ 73/664 |
| 6,370,958 B1 | * | 4/2002 | Uhlig ........................ 73/662 |
| 6,382,027 B1 | * | 5/2002 | Uhlig ........................ 73/579 |
| 6,386,042 B2 | * | 5/2002 | Wortge et al. ............... 73/657 |
| 6,481,545 B1 | * | 11/2002 | Yano et al. ............. 188/264 G |

\* cited by examiner

*Primary Examiner*—Hezron Williams
*Assistant Examiner*—Jacques M. Saint-Surin
(74) *Attorney, Agent, or Firm*—Gary A. Smith

(57) ABSTRACT

A method and apparatus for determining the vibration damping characteristics of an automotive brake structure measures the vibration response of a brake structure during application of random-frequency wide spectrum excitation, followed by measuring vibration of the structure at particularly noted modal frequencies, using a confined bandwidth random-frequency vibratory excitation. The method and apparatus may be used also to assess the bonding or attachment characteristics of damping materials.

14 Claims, 3 Drawing Sheets

METHOD FOR DETERMINING AUTOMOTIVE BRAKE STRUCTURE VIBRATION DAMPING AND FRICTION MATERIAL BONDING

This Application claims the benefit of U.S. Provisional Application No. 60/430,583 filed on Dec. 4, 2002.

BACKGROUND OF INVENTION

1. Field of the Invention

The present invention relates to a method and apparatus for determining the vibration damping characteristics of an automotive component such as a brake structure, e.g. a brake pad or brake shoe.

2. Disclosure Information

Automotive brake systems present unique challenges to designers inasmuch as such systems must be capable of stopping a vehicle reliably during a long service life. Vibration-induced noise in disc brake pads is an issue which asserted itself since the dawn of the disc-brake age in the annals of mass produced automobiles.

The production of audible noise by automotive disc-brake systems is greatly affected by the presence (or absence) of self-damping capability offered by the disc-brake pads themselves. Not surprisingly, it is therefore desirable to produce pads having self-damping characteristics in the vibration regimes which would otherwise produce noise. The assessment of a brake pad's self-damping characteristics have been the subject of previous inventive activity. As a result, several test methods and types of apparatus have been proposed, such as that shown in U.S. Pat. No. 6,382,027. The method and apparatus of the '027 patent uses an exciter which is pulsed on and off, with the actual vibration damping being measured while the exciter is in the deactivated mode. This type of operation is not suitable for high speed assessment of parts because the vibration assessment must be accomplished serially. In other words, the vibration response is not measured while the exciter is providing vibratory energy to the disc-brake pad. Thus, more time is required to obtain the assessment. Moreover, the capabilities of the method disclosed in the '027 patent are wanting because of limitations inherent in the time decay process. Moreover, other test methods such as the Oberst Bar test are capable of measuring damping only at lower frequencies.

It is advantageous that a method and apparatus according to the present invention overcomes problems associated with prior art methods and apparatus for determining the inherent damping characteristics of automotive brake structures, including brake pads, as well as other components.

SUMMARY OF INVENTION

As used herein, the term "insulator" means the friction material applied to the backing plate of either a disc brake pad or a drum brake shoe. According to the present invention, a method for determining the vibration damping characteristics of an automotive brake structure includes the steps of resiliently setting or mounting the brake structure to a stationary base, applying broadband random-frequency vibratory excitation to the brake structure, measuring the vibration response of the brake structure during application of the random-frequency excitation, including responsive vibration occurring at not less than one modal frequency, and applying a confined bandwidth random-frequency vibrator excitation to the brake structure, with the confined bandwidth being selected to correspond to at least one modal frequency. The present method further includes the steps of measuring the vibration response of the brake structure during application of the confined bandwidth signal, and using the measured vibration response of the brake structure to the confined bandwidth signal to calculate the damping value of the brake structure.

A method according to the present invention preferably utilizes broadband random-frequency excitation in the frequency range from 10 Hz to about 15 kHz. The brake structure is preferably excited by a variable reluctance actuator, which is a non-contacting actuator. The vibration response of the brake structure is preferably measured by a non-contacting sensor system such as a laser velocimeter. The confined bandwidth excitation preferably has a bandwidth of about 200 Hz to about 400 Hz, and a center frequency equal to one of the observed modal frequencies develop during broadband sweep.

According to another aspect of the present invention, a system for determining the vibration damping characteristics of an automotive component such as a brake structure includes a broadband, random-frequency vibratory exciter for inducing vibration in the component, and a non-contacting vibration measuring device for determining the frequency response of the component during the vibratory excitation, with the frequency response including the identification of a plurality of modal frequencies. A confined bandwidth random-frequency vibratory exciter then induces vibration in the test component at frequencies corresponding to the plurality of modal frequencies. Then, a processor determines the vibration damping characteristic of the component as the ratio of the difference in the frequency of the vibrations at a 3 dB vibration magnitude bandwidth, as a fraction of the frequency of vibration at the center of the confined bandwidth.

The present test apparatus may further include an environmental chamber for housing the component being tested, with the chamber having a ports for accommodating the vibratory exciter and the vibration measuring device.

The present vibration testing method and apparatus is advantageous because the time required to perform an assessment of the vibration is sufficiently brief that the present system may be used to assess high-volume production parts.

It is a further advantage of the present invention that the present method and system may be employed to nondestructively determine whether a disc brake pad insulator or shim friction material is properly bonded, or otherwise attached to a brake backing plate. This is important because the bonding characteristics of the pad insulator are an important determinator of brake pad vibration damping.

Other advantages, as well as objects and features of the present invention, will become apparent to the reader of this specification.

DETAILED DESCRIPTION

Figure 1:
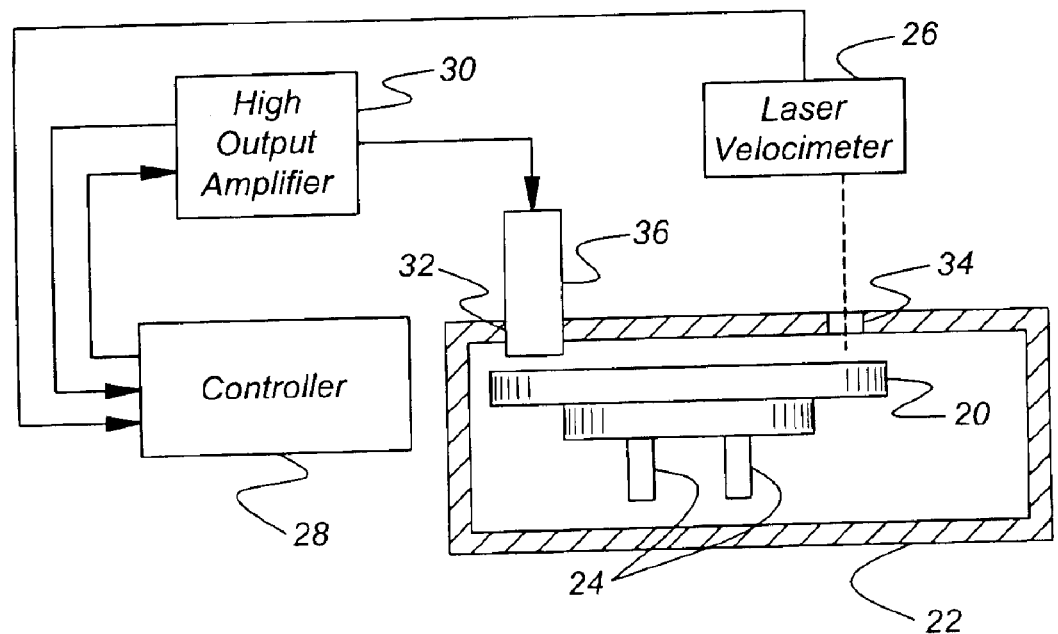
FIG. 1 is a systematic representation of a vibration damping test system according to the present invention.

As shown in FIG. 1, brake pad 20 is placed on stand 24 within environmental chamber 22, which may be used to provide heat for conducting a vibration assessment according to the present invention, at a variety of temperatures. Those skilled in the art will appreciate in view of this disclosure that the present method and system could be used for the purpose of determining vibration damping and component material bonding for parts other than automotive brake parts. As used herein, the term "mounting" means placing the part to be tested upon supports located within chamber 22 so that the part merely rests on the supports, or alternatively, attaching the part to the supports.

Brake pad 20 is placed upon stand 24, comprising silicone rubber supports, within environmental chamber 22. Exciter 36 passes into the interior of environmental chamber 22 through port 32. Exciter 36 is preferably a non-contact magnetic actuator which generates magnetic force. This type of device, sometimes termed a variable reluctance actuator, is sold by Electro Corporation under the model number 3030HTB. Exciter 36 is driven by high output amplifier 30, which may comprise a single-channel high output amplifier such as an AVC 790A01 model power amplifier. The amplifier's controls are operated by controller 28 drawn from a universe of such controllers known to those skilled in the art of vibration testing and suggested by this disclosure.

Vibrations of pad 20 are sensed by means of laser doppler velocimeter 26, which preferably comprises a laser velocimeter such as a Polytech PDV-100 or Polytech PSV-400 having a Class 2 visible helium/neon laser. Controller 28 includes a two-channel signal analyzer drawn from the class of such analyzers known to those skilled in the art and suggested by this disclosure, such as a Hewlett Packard model 35670A.

Figure 2:
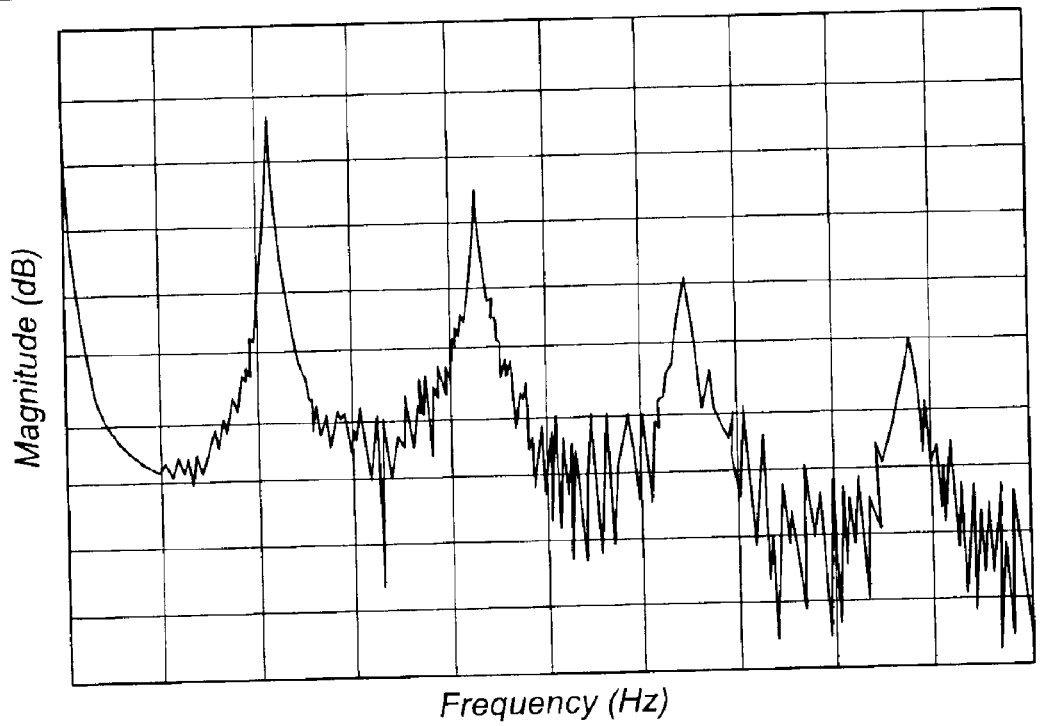
FIG. 2 is a frequency vibration plot developed during a broadband sweep of an automotive component according to the present invention.
Figure 3:
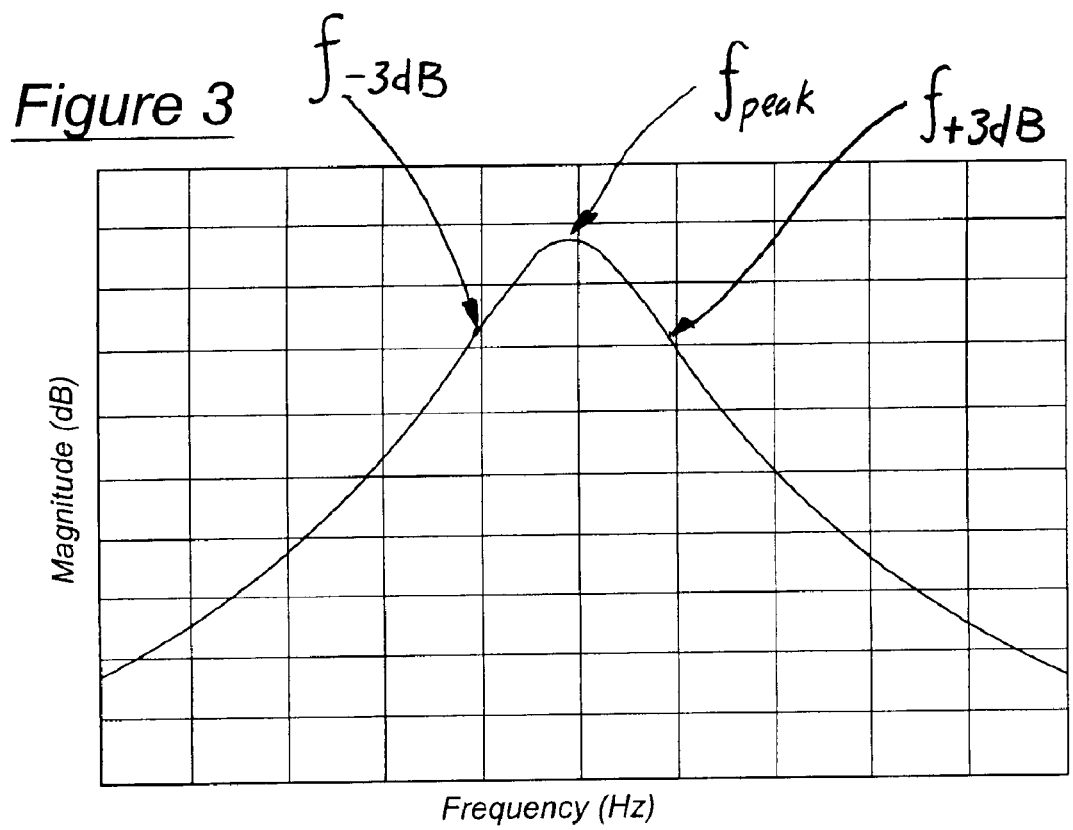
FIG. 3 is a frequency vibration plot produce by a confined bandwidth random-frequency vibratory excitation according to an aspect of the present invention.

According to the present invention, the experimental method begins as shown in FIG. 2 with a broadband excitation of pad 20 at frequencies of up to, or even exceeding, 15 kHz. The resulting vibration of pad 20 is measured by laser velocimeter 26, and a series of modal frequencies is developed, as shown in the FIG. 2. After the broadband sweep has been performed as shown in FIG. 2, controller 28 performs the assessment shown in FIG. 3, wherein a confined bandwidth random-frequency vibratory excitation is applied to pad 20. This excitation is selected to correspond to at least one of the previously developed modal frequencies. The narrow band random excitation signal preferably has a bandwidth of 200 Hz to 400 Hz, with the center frequency being equal to one of the modal frequencies. Then, the modal damping value is calculated using the half powered principle according to the following equation:

$$\eta = \frac{f_{+3dB} - f_{-3dB}}{f_{peak}}$$

Where η is damping loss factor, f+3 dB is the frequency of vibration at 3 dB less than the peak magnitude of vibration at the right side of the power spectra plot, and f−3 dB is 3 dB down from the peak magnitude of vibration on the left side of the power spectra plot. This is termed a "half power" calculation because 3 dB attenuation corresponds to a halving of the vibration power. As seen from the formula, the modal damping value increases as the slopes to and from the peak vibration value become increasingly smaller. In essence, controller 28 determines, for at least one of the modal frequencies, the vibration damping characteristic of a component as the ratio of the difference in the frequencies of the vibrations, at a predetermined off-peak magnitude (in the above example, at a vibration magnitude which is 3 dB less than the peak magnitude), to the value of the modal frequency.

Figure 4:
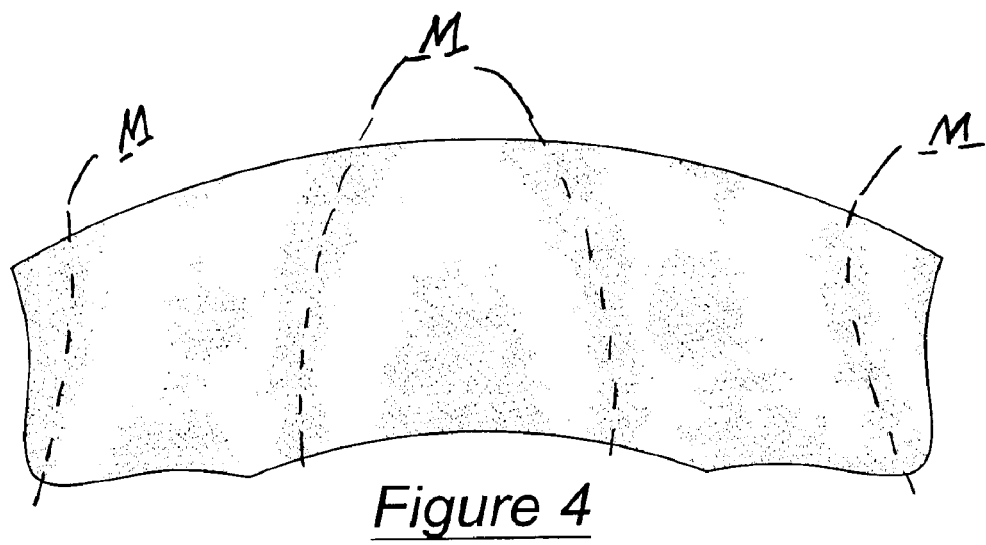
FIG. 4 illustrates a brake pad having modal vibration pattern indicating a consistent bonding pattern between the pad insulator and the brake backing plate.
Figure 5:
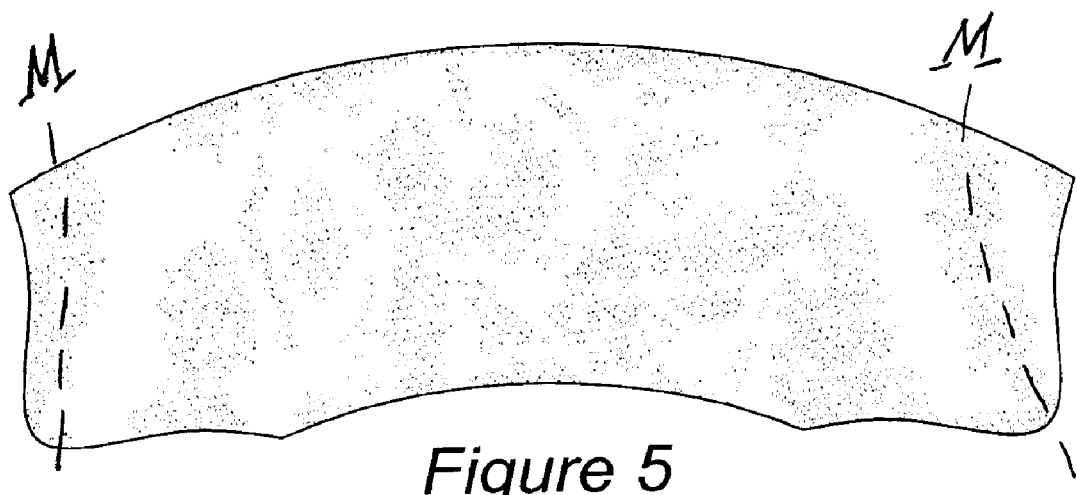
FIG. 5 illustrates a brake pad having an irregular distribution of bonding between the pad insulator and the backing plate.

As noted above, the present system may be used for assessing the structural integrity of a brake structure by comparing a pattern of modal lines developed at a fixed frequency with a predetermined pattern of such modal lines. FIG. 4 shows a well-developed pattern of modal lines, M, detected by sweeping velocimeter 26 over the surface of pad 20 while exciter 36 providing constant frequency vibratory excitement to pad 20. The pad shown in FIG. 4 has proper bonding between the pad's insulator and backing plate. In contrast with the situation of FIG. 4, the pad illustrated at FIG. 5 does not have proper bonding between the insulator and the backing plate, as shown by the absence of any coherent modal lines at the center region of the pad. The present invention allows the testing of pad in a non-destructive fashion, which can be used to more easily assess insulator bonding processes and materials.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A method for determining the vibration damping characteristics of an automotive brake structure, comprising the steps of:

resiliently mounting said brake structure to a stationary base;

applying broadband, random-frequency vibratory excitation to said brake structure;

measuring the vibration response of said brake structure during application of said random-frequency excitation, including responsive vibration occurring at not less than one modal frequency;

applying a confined bandwidth random-frequency vibratory excitation to said brake structure, with said confined bandwidth being selected to correspond to said at least one modal frequency;

measuring the vibration response of said brake structure during application of said confined bandwidth signal; and using the measured vibration response of said brake structure to said confined bandwidth signal to calculate the damping value of said brake structure.

2. A method according to claim 1, wherein said broadband random-frequency excitation ranges in frequency from 10 Hz to 15 kHz.

3. A method according to claim 1, wherein said brake structure is excited by a variable reluctance actuator.

4. A method according to claim 1, wherein said vibration response of said brake structure is measured by a non-contacting sensor system.

5. A method according to claim 4, wherein said non-contacting sensor system comprises a laser velocimeter.

6. A method according to claim 1, wherein the damping value of said brake structure is calculated as:

$$\eta = \frac{f_{+3dB} - f_{-3dB}}{f_{peak}}$$

where:

fpeak=the center frequency of a modal vibration;

f+3 dB=the frequency, higher than fpeak, which corresponds to 3 dB reduction in the magnitude of vibration; and f−3 dB=the frequency, lower than fpeak, which corresponds to 3 dB reduction in the magnitude of vibration.

7. A method according to claim 1, wherein said confined bandwidth excitation has a bandwidth of 200 Hz–400 Hz and a center frequency equal to said at least one modal frequency.

8. A method for determining the vibration damping characteristics of an automotive brake structure, comprising the steps of:

resiliently mounting said brake structure to a stationary base;

applying a broadband random-frequency vibratory excitation to said brake structure by using a non-contacting actuator;

measuring the vibration response of said brake structure to said broadband random-frequency excitation by using a laser velocimeter, with said measurement including the measurement of vibratory response occurring at a plurality of modal frequencies during application of said vibratory excitation;

serially applying a plurality of confined bandwidth random-frequency vibratory excitations to said brake structure, with each of said confined bandwidth excitations having a center frequency corresponding to one of said modal frequencies;

measuring the vibration response of said brake structure during application of said confined bandwidth excitations; and using the measured vibration response of said brake structure to said confined bandwidth excitations to calculate damping values for said brake structure at said plurality of modal frequencies.

9. A method according to claim 8, wherein said random-frequency excitation ranges in frequency from 10 Hz to 15 kHz.

10. A method according to claim 8, further comprising the step of determining the structural integrity of said brake structure by comparing a pattern of modal lines developed at a fixed frequency with a predetermined pattern of such modal lines.

11. A method according to claim 8, wherein said brake structure comprises a disc brake pad.

12. A system for determining the vibration damping characteristics of an automotive component, comprising:

a broadband, random-frequency vibratory exciter for inducing vibration in said component;

a non-contacting vibration measuring device for determining the frequency response of said component during said vibratory excitation, with said frequency response including a plurality of modal frequencies;

a confined bandwidth random-frequency vibratory exciter for inducing vibration in said component at frequencies corresponding to said plurality of modal frequencies; and a controller for determining, for at least one of said modal frequencies, the vibration damping characteristic of said component as the ratio of the difference in the frequencies of the vibrations, at a predetermined off-peak magnitude, to the value of said modal frequency.

13. A system according to claim 12, wherein said processor determines said vibration damping characteristic at a plurality of modal frequencies.

14. A system according to claim 12, further comprising an variable temperature environmental chamber for housing said component, with said chamber having at least one port for accommodating said vibratory exciter and said vibration measuring device.

* * * * *